March 4, 1969 TOSHIO WATANABE ET AL 3,431,466

ARC-SUPPRESSING CIRCUIT FOR SWITCHING DEVICES IN ALTERNATING CURRENT CIRCUIT

Filed July 20, 1966 Sheet 1 of 3

INVENTORS
TOSHIO WATANABE
BY SHIGETSUGU UKITA

Wolfe, Hubbard, Voit & Osann
ATTYS.

INVENTORS
TOSHIO WATANABE
BY SHIGETSUGU UKITA

Wolfe, Hubbard, Voit & Osann
ATTYS.

INVENTORS
TOSHIO WATANABE
SHIGETSUGU UKITA
BY
Wolfe, Hubbard, Voit & Osann
ATTYS.

United States Patent Office 3,431,466
Patented Mar. 4, 1969

3,431,466

ARC-SUPPRESSING CIRCUIT FOR SWITCHING DEVICES IN ALTERNATING CURRENT CIRCUIT

Toshio Watanabe and Shigetsugu Ukita, both of 480, Kami-Takaido, Suginami-ku, Tokyo, Japan Filed July 20, 1966, Ser. No. 566,534
Claims priority, application Japan, July 30, 1965, 40/46,290; Aug. 18, 1965, 40/50,250
U.S. Cl. 317—11 8 Claims
Int. Cl. H02h *3/00, 7/00, 7/22*

ABSTRACT OF THE DISCLOSURE

An arc-suppressing circuit for an electrical switch connected in series with a load, the circuit comprising a two-terminal multilayer semiconductor element connected in parallel with the switch contacts. A number of different circuits associated with the switch and the semiconductor element, are disclosed, the circuits including resistors, capacitors, inductors, and transformers in various series and parallel combinations.

This invention relates to arc-suppressing circuits wherein alternating current switches can be opened and closed without generating arcs.

Generally an electric device is started and stopped by means of a switching device. However, there is a defect that, in a switch using contacts, when the current to be switched is large, an arc discharge will be generated between the contacts and the contacts will be worn.

In order to solve this kind of problem, there are already provided the following methods. The first of them is a method wherein the electric current is interrupted at the zero point. The second is a method wherein a mechanical arc-suppressing device is added. The third is an electric method wherein a capacitor is used in an arc-suppressing circuit. In the first method, the phase control is difficult and the mechanism is complicated. In the second method, the arc is not completely suppressed but only the duration of the arc is shortened. The third method is simple and effective, but, in practice, when the electric power to be switched exceeds 50 watts, effectiveness of the element is reduced.

The present invention is provided to solve the above mentioned problem.

A two-terminal semiconductor element such as a four- or five-layer diode or the like has characteristics such that when it shifts from a high impedance state to a low impedance state, that is, from the nonconducting state to the conducting state, and once comes to be in the conducting state in response to the critical value of the rising velocity *dv/dt* of the voltage at both ends or in response to an impressed voltage higher than the breaking voltage or avalanche voltage, it will remain in such state. But when the voltage applied to both ends of the two-terminal multilayer semiconductor element becomes lower than the voltage required to maintain the holding current through said element, it will quickly return to the non-conducting state. The present invention provides an arc-suppressing circuit wherein a four- or five-layer diode of such characteristics is inserted in parallel with the switching contacts of an alternating current circuit. An object of the present invention is to provide an arc-suppressing circuit wherein, in switching contacts with which a two-terminal semiconductor element such as a four- or five-layer diode is connected in parallel, said element is kept in the conducting state from the time of opening the contacts until just before the first zero point of the varying current or to the limit value of the current held by said element. Consequently, an arc current may flow between the opened contacts, the switching contacts may be simply and positively prevented from being damaged, the switching capacity of the switching device may be increased and the apparatus may be made small and long-lived.

The present invention shall now be explained with reference to the drawings.

FIG. 1 shows typical voltage-current characteristics of a two-terminal semiconductor element such as a four- or five-layer diode used in the circuit of the present invention.

In FIG. 2, (*a*) shows a form of a typical arc voltage generated between contacts when the contacts are opened and closed or specifically when they are opened and (*b*) shows a typical voltage between the contacts in case the arc between the contacts is suppressed by using a two-terminal semiconductor element.

Figure 1:
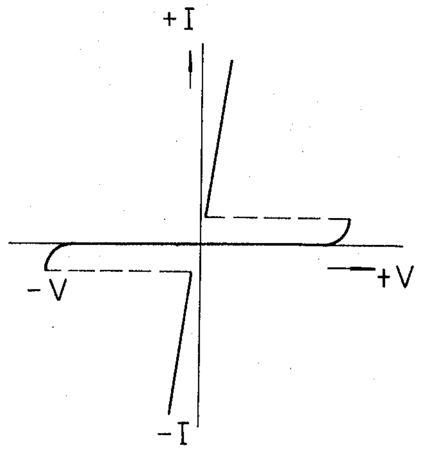

In the drawings, SSS is a five-layer diode, SW is a switch, L is a load, $C_1$, $C_2$ and $C_3$ are condensers, R is a resistance, L′ is an inductance, T is a transformer and $L_1$ and $L_2$ are primary and secondary windings of the transformer T, respectively.

Figure 2:
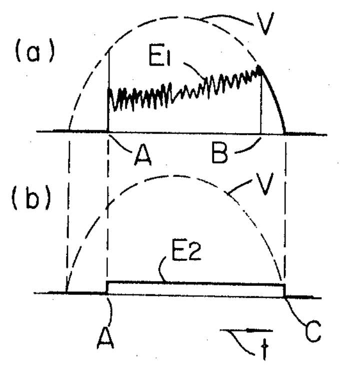

Generally, in an alternating current circuit, in case the switching contacts are opened at the point A in (*a*) in FIG. 2, a voltage generated between the contacts or an arc voltage will appear as $E_1$. Said arc voltage $E_1$ will produce a voltage rising quickly at the point A when the contacts are opened, will become an unstable arc when the current is so small as to be less than about 1 ampere but will become a stable arc as the current becomes larger. After the arc voltage is generated, it will rise as the distance between the contacts becomes larger with the lapse of time, and the arc will vanish at the time when the load current has become lower than the current value required to maintain the arc; that is, at the point B in (*a*) in FIG. 2, the arc current will be electrically interrupted and therefore the supply voltage V will appear between the contacts. FIG. 2 is to explain the case of a power factor of 100%. However, it will be the same even when the power factor varies.

Figure 3:
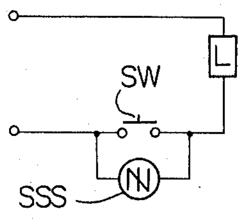
FIG. 3 shows a basic circuit wherein a two-terminal semiconductor element is inserted in parallel between the contacts of an alternating current circuit so that, in the rise of an arc voltage generated between the contacts, current may be conducted through the five-layer diode and the arc between the contacts may be absorbed within the time of the maximum ½ cycle.

The present invention by-passes the above mentioned arc current for the maximum ½ cycle with a five-layer diode inserted in parallel between the contacts so that no arc may be generated between the contacts. FIG. 3 shows a basic circuit wherein the quick rising velocity voltage at the moment of opening the contacts is used as impressed directly on a five-layer diode SSS. Due to the voltage having the quick rising velocity at the moment of opening the contacts, a charging current will quickly flow to a combined condenser inherent to the diode SSS. Due to the multiplied effect of the breaking effect by the quick rising voltage velocity *dv/dt* and the effect of the local temperature rise by the charging current, the impedance of the diode SSS will reduce and the arc current will flow on the side of the diode SSS. Therefore, at the time when the arc current between the contacts becomes smaller than the minimum arc maintaining current, the arc will automatically eliminate, and the current completely will move to the diode SSS side from the contact side and the voltage between the contacts will appear as $E_2$ in (*b*) in FIG. 2. Thereafter, the diode SSS will lose the holding capacity at the point C just before the zero point of the initial current where the current becomes lower than its held current and will return from the conducting state of a low impedance to the nonconducting state of a high impedance. At this time, the distance between the contacts will be large enough, the insulation will have been recovered, therefore there will be no arc again and the load circuit will be perfectly interrupted within a short time of the maximum ½ cycle by the suppression of the arc between the contacts.

The above is an explanation of the time of opening the contacts. On the other hand, when the contacts are to be closed, the contacts will spring and open due to the impact at the time of the contact of the contact points and therefore a short arc will be generated. However, in such case, due to the same operating principle as in the above described time of opening the contacts, the generation of the arc will be prevented and, at the time when the contacts have completely closed into contact, the voltage between the contacts will be lower than the voltage keeping the current held by the diode SSS, the diode SSS will return to the nonconducting state of a high impedance and the load current will flow on the contact side. Thus the arc damage caused by the springing can be prevented.

Figure 4:
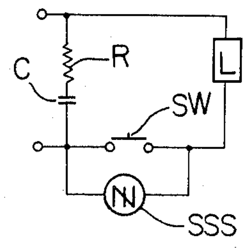
FIGS. 4 to 7 show applied circuits.

FIG. 4 is of the same operating principle as in FIG. 3. The condenser C and resistance R are inserted in parallel in the series circuit of the switch SW and load L on the electric source side of the diode SSS for the protection from surges so that, in case the contacts SW are opened, the diode SSS may be prevented from being in the conducting state due to the surge voltage from the electric source line.

Figure 5:
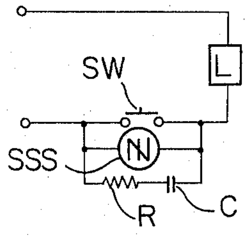

FIG. 5 is of the same operating principle as in FIGS. 3 and 4. However, the series circuit of the condenser C and resistance R is inserted in parallel with the diode SSS so that the surge applied to both ends of the diode SSS may be prevented and the diode may be protected.

Figure 6:
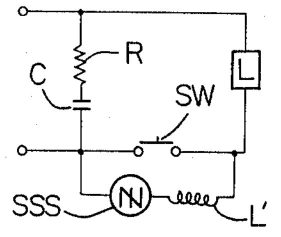

FIG. 6 shows a circuit wherein an inductance L′ is inserted in series with the diode SSS and in parallel with the switch SW in the circuit in FIG. 4 so as to be used to restrict the current in the case of interrupting a large current.

Figure 7:
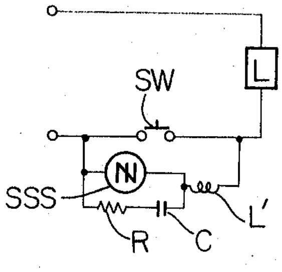

FIG. 7 shows a circuit where in an inductance L′ is inserted in series with the diode SSS and in parallel with the switch SW so as to be used to restrict the current in the case of interrupting a large current.

Figure 8:
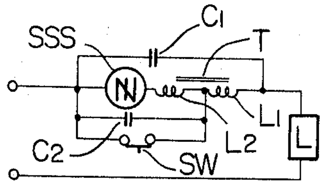
FIG. 8 shows a basic circuit wherein an auxiliary circuit is provided together with a two-terminal semiconductor element such as a five-layer diode between the contacts of an alternating current circuit so that the rising velocity voltage of an arc may be converted to a high frequency oscillation voltage and may be stably conducted irrespective of the magnitude of the rising velocity voltage.

FIG. 8 shows a circuit wherein the quick rising velocity voltage at the time of opening the contacts is converted to a high frequency oscillation voltage by the inductance and condenser and this oscillation voltage is impressed on the diode SSS. When the switch SW is opened, an arc voltage having a quick rising velocity will be generated by the opening, and at the same time a charging current will flow to the condenser $C_1$ through the primary coil $L_1$ of the transformer T. Consequently, a high frequency oscillation current will flow in the closed circuit of $C_1$–$L_1$–SW and will be transmitted from the primary coil $L_1$ to the secondary coil $L_2$, and a high frequency oscillation voltage will be generated between the terminals of the secondary coil $L_2$. By this high frequency oscillation voltage, the diode SSS current will be conducted and the arc between the contacts will be by-passed and suppressed. At the time when the diode SSS current becomes subsequently lower than the held current, the circuit will be perfectly interrupted. $C_2$ is a surge voltage preventing condenser added to prevent the diode SSS from being made to be in a conducting state by the surge voltage from the electric source line and load line in case the contacts are opened. As the surge voltage is considerably absorbed by the condenser $C_1$, it is possible to remove the surge voltage preventing condenser $C_2$ as required.

Figure 9:
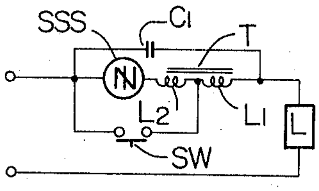
FIGS. 9 to 15 show its applied circuits.

FIG. 9 shows a circuit wherein the surge voltage preventing condenser $C_2$ is removed in the circuit in FIG. 8.

Figure 10:
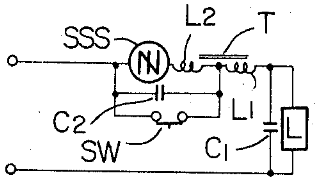

FIG. 10 shows a circuit made to effectively operate in case the impedance on the electric source side is low against the high frequency oscillation current. When the switch SW is opened, an arc voltage having a quick rising velocity will be generated by the opening; a high frequency oscillation current will flow in the closed circuit of $C_1$–$L_1$–SW at the same time and will be transmitted from the primary coil $L_1$ to the secondary coil $L_2$; a high frequency oscillation voltage will be generated between the terminals of the secondary coil $L_2$ and the diode SSS current will be conducted by this voltage and will by-pass and suppress the arc between the contacts. At the time when the SSS current becomes smaller than the held current, the circuit will be perfectly interrupted. $C_2$ is a surge voltage preventing condenser added to prevent the diode SSS from being made to be in a conducting state by the surge voltage from the electric source line and load line in case the contacts are in an opened state. As the surge voltage is considerably absorbed by the condenser C, the condenser $C_2$ may be added as required.

Figure 11:
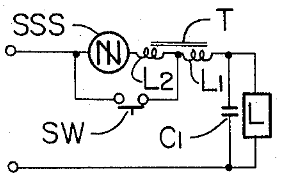

FIG. 11 shows a circuit wherein the surge preventing condenser is removed in the circuit in FIG. 10.

Figure 12:
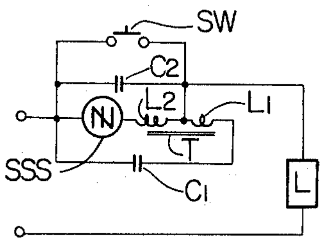

FIG. 12 shows a circuit wherein the primary coil $L_1$ in FIGS. 8 and 10 is not to be added to an operation as a load and the high frequency oscillation voltage is to be applied to the condenser $C_1$ and load L from the primary coil $L_1$ so as to prevent damping by the load L.

Figure 13:
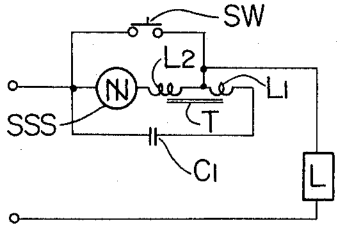

FIG. 13 shows a circuit wherein the condenser $C_2$ for preventing surge voltages is removed in FIG. 12.

Figure 14:
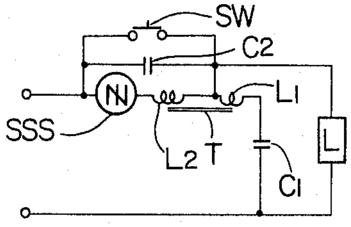

FIG. 14 is a circuit which is of the same operating principle as in FIG. 12 but is made to effectively operate in case the impedance on the electric source side is low against the high frequency oscillation current.

Figure 15:
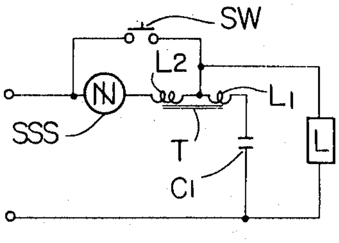

FIG. 15 is a circuit wherein the condenser $C_2$ for preventing surge voltages is removed in the circuit in FIG. 14.

While there has been described in connection with the preferred embodiment of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. An arc-suppressing circuit for switching devices comprising a primary coil of a transformer connected between a switch and load, a two-terminal multilayer semiconductor commutating element and secondary coil of the transformer connected between both contacts of said switch and a condenser connected between the connecting point of the primary coil of said transformer and the load and the contact on the electric source side of the switch so that a by-pass circuit passing through said two-terminal multilayer semiconductor element may be formed of high frequency oscillations generated in the secondary coil of the transformer when the switch is opened.

2. The arc-suppressing circuit according to claim 1 wherein a condenser is connected to both ends of a switch.

3. An arc-suppressing circuit for switching devices comprising a primary coil of a transformer connected between a switch and load, a two-terminal multilayer semiconductor element and secondary coil of the transformer connected between both contacts of said switch and a condenser connected to both ends of said load.

4. The arc-suppressing circuit according to claim 3 wherein a condenser is connected to both ends of the switch.

5. An arc-suppressing circuit for switching devices comprising a series circuit of a two-terminal multilayer semiconductor element and secondary coil of a transformer connected in parallel between both contacts of a switch, a load connected to the contact opposite the electric source side of the contacts of said switch and a condenser and primary coil of said transformer connected in parallel between both contacts of said switch.

6. The arc-suppressing circuit according to claim 5 wherein a condenser is connected to both ends of the switch.

7. An arc-suppressing circuit for switching devices comprising a series circuit of a two-terminal multilayer semiconductor element and secondary coil of a transformer connected in parallel between both contacts of a switch, a load connected to the contact opposite the electric source side of the contacts of said switch and a series circuit of a primary coil of said transformer and condenser connected to both ends of said load.

8. The arc-suppressing circuit according to claim 7 wherein a condenser is connected between both contacts of the switch.

References Cited

UNITED STATES PATENTS

| | | | |
|---|---|---|---|
| 3,152,282 | 10/1964 | Baltensperger et al. | 317—11 |
| 2,637,769 | 5/1953 | Walker | 317—11 |
| 2,802,149 | 8/1957 | Germer et al. | 317—11 |
| 3,184,619 | 5/1965 | Zydney | 317—11 |
| 3,273,018 | 9/1966 | Goldberg | 317—11 |
| 3,283,211 | 11/1966 | Claesson et al. | 317—11 |
| 3,330,992 | 7/1967 | Perrins | 317—11 |

LEE T. HIX, *Primary Examiner.*

R. V. LUPO, *Assistant Examiner.*

U.S. Cl. X.R.

317—33